United States Patent [19]

Spanhel et al.

[11] Patent Number: 5,059,346
[45] Date of Patent: Oct. 22, 1991

[54] CADMIUM SULFIDE MEMBRANES

[75] Inventors: Lubomir Spanhel; Marc A. Anderson, both of Madison, Wis.

[73] Assignee: Wisconsin Alumni Research Foundation, Madison, Wis.

[21] Appl. No.: 340,101

[22] Filed: Apr. 18, 1989

[51] Int. Cl.[5] .................... C09K 11/54; C09K 11/56; C01G 11/02
[52] U.S. Cl. .................... 252/301.6 S; 252/301.6 P; 423/566.1; 428/690; 428/698
[58] Field of Search ................ 252/301.6 S, 301.6 P; 428/690, 698; 423/566.1

[56] References Cited

U.S. PATENT DOCUMENTS 4,204,933  5/1980  Barlow et al. .................. 204/181 N
4,623,437 11/1986  Visca et al. ........................ 501/134
4,882,517 11/1989  Maruyama et al. .......... 252/301.6 S

OTHER PUBLICATIONS

Kuczynski et al., J. Phy. Chem., 88, pp. 980–984, 1984.
Basov et al., "Laser Action in CdS Induced by Two-Photon Optical Excitation from a Ruby Laser," *Soviet Physics-Solid State*, 7:12, 2932–2933 (1966).
Bogdankevich et al., "Uncooled Pulses Cadmium Sulfide and Gallium Arsenide Lasers Pumped Longitudinally by an Electron Beam," *Sov. J. Quantum Electron.* 15:7, 1000–1002 (1985).
Brodin et al., "Lasing from CdS Single Crystals Illuminated by a Flashlamp," *Sov. Phys. Tech. Phys.* 28:9, 1138–1139 (1983).
Fuchs et al., "Optically Pumped CW Semiconductor Ring Laser," *Appl. Phys. Lett.* 43 (1): 32–34 (1983).
Henglein, "Mechanism of Reactions on Colloidal Microelectrodes and Size Quantization Effects," *Topics in Current Chemistry*, 143:113–116, 129–132, 164–180 (1988).
Lang, "Extensions of Semiconductor Lasers to Higher Power and Longer Wavelength," pp. 149–162 (?).
Spanhel et al., "Photochemistry of Semiconductor Colloids...," *Ber. Bunsenges, Phys. Chem.*, 91, 88–94 (1987).
Spanhel et al., "Photochemistry of Colloidal Semiconductors...," *J. Am. Chem. Soc.*, 109, 5649–5655 (1987).

Primary Examiner—Gary P. Straub
Assistant Examiner—Stephen G. Kalinchak
Attorney, Agent, or Firm—Quarles & Brady

[57] ABSTRACT

A method is described for the creation of novel q-effect cadmium sulfide membranes. The membranes are made by first creating a dilute cadmium sulfide colloid in aqueous suspension and then removing the water and excess salts therefrom. The cadmium sulfide membrane thus produced is luminescent at room temperature and may have application in laser fabrication.

10 Claims, 2 Drawing Sheets

CADMIUM SULFIDE MEMBRANES

This invention was made with United States government support awarded by the Department of Energy (DOE), Grant #(s): PO AX0798826-1, DE-AC05-840R211400. The United States Government has certain rights in this invention.

FIELD OF THE INVENTION

The present invention relates to membranes of semiconductor materials in general and relates, in particular, to the creation of a new form of cadmium sulfide membrane.

BACKGROUND OF THE INVENTION

Cadmium sulfide is a known semi-conductor material available conventionally in crystalline form. Cadmium sulfide crystals can be used for various semi-conductor applications and are normally grown by crystalline growth by withdrawing a seed crystal from a molten pool of elemental cadmium sulfide heated to liquid form. Cadmium sulfide can be fabricated into wafers or other materials having various uses in semi-conductor and integrated circuit technologies.

Cadmium sulfide crystals have also been investigated for various practical applications. Various investigators have created the possible use of polished cadmium sulfide single crystals for applications in laser development Aasov investigated pulsed two-photon optical pumping in polished cadmium sulfide crystals forming a Fabry-Perot cavity which was investigated for its laser activity. Fuchs et al. developed an argon pumped CW-CdS platelet ring laser with the hope of combining the advantages of an increased spectral range over dye lasers and with the possibility of intra-cavity tuning elements which were not yet available in semi-conductor diode lasers at the time. Other investigators reported that Xenon flash-induced lasing could be created in cooled cadmium sulfide single crystal and electron beam pumped uncooled multi-element cadmium sulfide lasers were reported. Unfortunately, the low lasing efficiency and optical damage place the cadmium sulfide material in a category far from commercial application and comparatively unattractive in comparison to other lasing materials.

It has been previously demonstrated that dilute colloidal suspensions of extremely small cadmium sulfide particles have been created which exhibit unique and interesting size quantization effects. See Henglein "Mechanism of Reactions on Colloidal Microelectrodes and Size Quantitation Effects," *Topics in Current Chemistry*, Vol. 143, pp. 115–116, 129–132, 165–180 (1988). These particles are referred to as "Q" particles. These size-quantization effects become noticeable when the particle size is comparable or smaller than the diameter of the exciton in a semi-conductor macrocrystal. Dilute colloidal suspensions of Q-CdS particles can be shown to have unique quantum mechanical behavior deriving from the extremely small particle size which can be observed by their ultraviolet and visible and luminescence spectra which can be observed in aqueous suspension.

SUMMARY OF THE INVENTION

The present invention is summarized in that a quantum effect cadmium sulfide membrane is created consisting of a porous membrane of cadmium sulfide particles wherein the particle size is sufficiently small that quantum mechanical behavior can be observed in the ultraviolet and visible spectra of the resulting membrane.

It is an object of the present invention to provide a quantum effect cadmium sulfide membrane having unique photophysical properties and very intense luminescence at room temperatures. Such a membrane holds potential application as a cadmium sulfide based laser.

The present invention is also directed to a method of creating new size quantization effect cadmium sulfide membranes.

It is another object of the present invention to provide such membranes which may have potential uses in photo-electro-optical and lasing applications.

Other objects, advantages and features of the present application will become apparent from the following specification when taken in conjunction with the accompanying drawings.

DETAILED DESCRIPTION OF THE INVENTION

Figure 1:
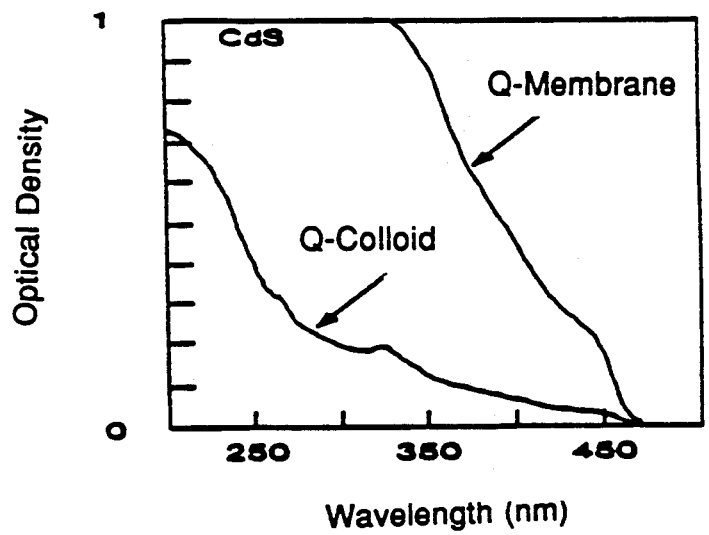
FIG. 1 is a graphic plot of the UV-visible spectra of Q-CdS colloidal solutions and membranes.

The fabrication of the quantum effect cadmium sulfide membranes in accordance with the present invention takes place, in essence, in a series of three steps. The first step is the preparation of a highly diluted colloid of extremely small cadmium sulfide particles. The second step is the concentration of this colloidal suspension under controlled ionic strength conditions to make a concentrated colloid. The third step is the controlled evaporation of the solvent from the concentrated colloidal suspension under conditions such as to leave a solvent-free membrane. Under proper conditions, the material proceeds irreversibly from step-to-step until a stable and useful quantum effect cadmium sulfide membrane is created.

The preparation of Q effect cadmium sulfide colloids has been previously described by others.

Henglein, *Topics in Current Chemistry*, Vol. 143, pp. 113–180 (1988). The process essentially involves dissolving a cadmium salt in aqueous solution together with a quantity of a stabilizer, typically sodium polyphosphate. The cadmium salt and polyphosphate solution is purged by percolation of nitrogen gas to remove excess oxygen. Then, while the pH of the solution is held constant, hydrogen sulfide gas in limited quantities is percolated through the solution preferably diluted again in nitrogen. The solution is vigorously stirred while this process proceeds. The resulting colloid will have a characteristic color which varies somewhat depending on the relative concentrations of the cadmium ion and the polyphosphate in the beginning salt solution. The color is related to the size of the particles in the colloid and is characteristic of the quantum effects associated with particles of certain sizes. The colors are characteristic since the size of the actual particles themselves is on the same order of magnitude as the wave length of visible light which can be absorbed by the particles in the colloid. Typically the colloids can range from colorless through yellow-greenish to a deeper color and are in all cases optically transparent.

The size quantization effects from such a highly diluted colloid can be demonstrated while the particles are still in solution. It is possible to observe characteristic luminescence of such colloidal solutions and the characteristic luminescence spectra of the colloids will be characteristic of the colloids as determined by the relative concentrations of the cadmium and polyphosphate in the initial salt solution.

The polyphosphate appears to stabilize the cadmium-sulfide in solution. In the absence of polyphosphate, the cadmium sulfide will precipitate from the medium in particulate form and the result will not be a colloid but a precipitated powder.

A highly diluted cadmium sulfide colloid as described above can then be concentrated through a process of desalting and concentration. Several alternative approaches are possible to achieve the desirable concentrated colloidal suspension. A typical methodology might involve beginning with a rotary evaporator to reduce the volume of the colloid by approximately a factor of five, or, in other words to remove an initial 80% of the water. The remaining suspension can then be placed in a dialysis assembly and dialyzed against ultrapure water. Such a dialysis would remove additional water from the colloidal suspension at the same time. The dialysis would also remove the excess salts from the initial suspension not involved in the cadmium sulfide and polyphosphate matrix. The colloidal suspension can then be further concentrated by roto-evaporation.

An alternative technique for concentrating the dilute colloidal suspension is through the use of a micro filtration cell. A micro filter such as the finest ultra filtration membranes currently available can be used to, in essence, filter the colloid against the ultrafine micro filter. This can be accomplished by forcing the suspension against the ultrafine micro filter and then washing it continually with ultra pure water in a nitrogen atmosphere under pressure.

The result of either of these techniques will be a highly concentrated colloidal suspension. The purification should continue until the concentrated colloidal suspension exceeds a given value of conductivities, such as twenty to thirty micro-mhos. The resulting colloidal solutions made by this process can vary from optically transparent to yellow-greenish or greenish in color and are stable for days at room temperature without flocculation or particle growth.

The next part of the process is the procedure to evaporate the solvent from the concentrated colloidal suspension to create the solid membrane. This process begins by spreading the concentrated colloidal solution in a suitable receptacle and keeping it at room temperature in a confined container under approximately sixty percent relative humidity. After two days of such storage, a super saturated xerogel is obtained. Such a xerogel is a dry gel form or precursor to a completed dry membrane. The transition from a concentrated colloid to a xerogel can be reversible or non-reversible depending on the relative concentrations of the initial cadmium ion and polyphosphate in the salt solution. If the concentration of polyphosphate is higher in the original salt solution and thus in the original colloid, the formation of the xerogel will be reversible, that is, additional water will allow the xerogel to be transferred back to a state of colloidal suspension. If the concentration of cadmium salt is higher in the initial salt solution compared to the polyphosphate, the transition from a colloid to a xerogel becomes completely irreversible and the resulting xerogel becomes a rigid solid-appearing structure. At intermittent levels of the ratio between the cadmium ion and the polyphosphate, an elastic xerogel is created which will not completely reverse in state but is also flexible and elastic when placed in water. The xerogel is then placed at a room temperature of humidity, i.e. of a humidity of approximately twenty to thirty percent until seemingly dry. To completely remove the solvent from the membrane, the xerogel can be dried in a high vacuum ($10^{-5}$ torr) at a slightly elevated temperature of 40° C.

The resulting cadmium sulfide membrane will exhibit size quantization effects similar to those previously obtained with the Q-effect colloidal suspension of cadmium sulfide particles. The membrane can be relatively crack free and completely crack free membranes can be obtained of reasonable sizes by this process. The resulting membrane is completely water free and, most importantly, exhibits extremely intensive room-temperature luminescence properties. It is these optical properties that make the membrane of interest for a variety of applications including potentially as a lasing material.

Shown in FIG. 1 is a comparison of the optical characteristics of a Q-effect cadmium sulfide colloid and a Q-effect cadmium sulfide membrane. The graph of FIG. 1 illustrates that the absorption onset occurs in both samples at around 460 nm indicating that both samples contain Q-effect particles of approximately the same size which would calculate to be approximately 30 Angstroms. This is in contrast to the absorption onset of cadmium sulfide macrocrystals which occurs around 515 nm. The strong blue shift of the colloidal particles is due to the confined "exciton in the small particle box" as has already been demonstrated in previous literature regarding the Q-effect cadmium sulfide colloids. The existence of this blue shift in the cadmium sulfide membrane and its strong correlation with the observed Q-effect in the cadmium sulfide colloidal suspension is strong evidence that the membranes are in fact Q-effect materials exhibiting similar luminescence properties to the Q-effect colloidal suspension materials although at a greatly increased intensity.

Figure 2:
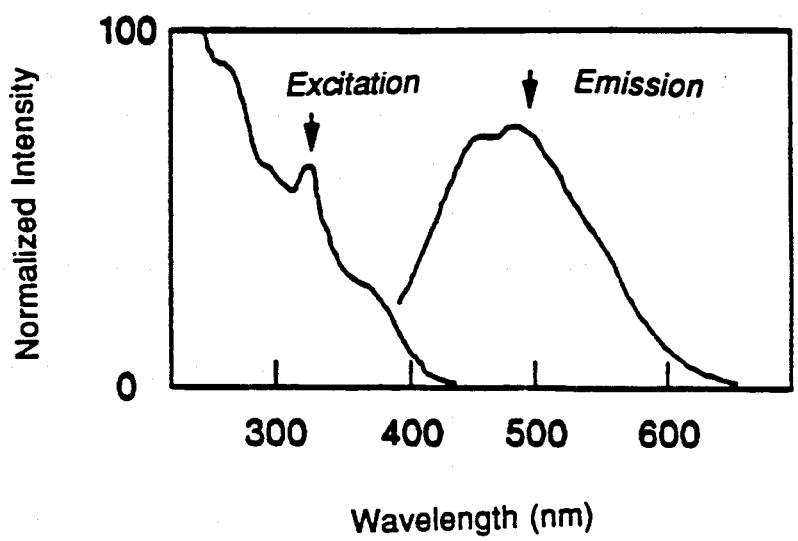
FIG. 2 is a graphical plot of an excitation and photoluminescence spectrum of a Q-Cds colloid which has been used for fabrication of membranes.
Figure 3:
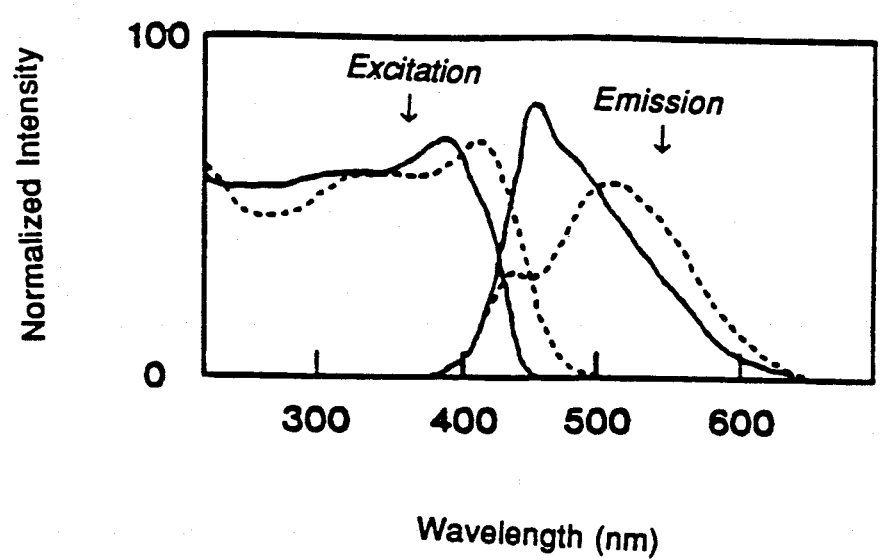
FIG. 3 is a graphical plot of luminescence-excitation photoluminescence of two different Q-CdS membranes.

Shown in FIGS. 2 and 3 are similar plots of luminescence and corrected luminescence-excitation spectra detected for fresh Q-effect cadmium sulfide colloids and Q-effect cadmium sulfide membranes respectively. One immediate observation is that unlike the instance of Q-effect colloids in suspension, the shape and maximum of the luminescence spectra in the Q-effect membrane is independent of the excitation wave length. The high surface to volume ratio of the membranes permits the chemical or physical tailoring of particle size and surface chemistry in such a fashion as to control the spectral distribution of luminescence.

One interesting phenomenon of the Q-effect cadmium sulfide membrane is that in the absence of water they exhibit high emissivity and little or no conductivity. By contrast, when the Q-effect cadmium sulfide membranes are saturated with water, the emissivity is virtually quenched and the conductivity increases to practical levels of electrical conductivity. The mechanism by which this phenomenon occurs is obscure.

The size of the particles in the cadmium sulfide Q-effect membrane can be adjusted by means of adjusting the concentration of cadmium ions in the initial salt solution. It has been discovered that concentrations on the order of $3 \times 10^{-4}$ molar cadmium ions result in smaller particle size (around 20 Angstroms) while higher concentrations of cadmium, for example about $2.5 \times 10^{-3}$ molar result in slightly larger particle sizes (30 to 50 Angstroms). As particle size increases, there is a red shift in the emission spectra of the type illustrated in FIG. 3, with the emission spectra of a slightly larger particle size illustrated by the dashed lines in FIG. 3.

EXAMPLES

1. Preparation of 20 Angstrom Q-CdS Colloid

An optically transparent Q-CdS colloid was prepared in a three-neck-flask at room temperature. The flask was equipped with a pH electrode so as to be able to closely follow pH of the solution, and also with a septum through which sodium hydroxide or hydrochloric acid could be injected to adjust pH. A gas inlet dispersion tube was also provided in the flask. Stock solutions used were 0.2M Cd $(ClO_4)_2$ (Alfa), 0.1M sodium polyphosphate stabilizer (Sigma, fed. grade F.W. 1592 g/mol). The gases $H_2S$ (99.9%) and $N_2$ (99.9%) were used without further purification.

The colorless Q-CdS sol preparation began with the creation of a 1 liter aqueous solution of $3 \times 10^{-4}$M $Cd_{2+}$ and $1 \times 10^{-4}$M polyphosphate (PP). Through this solution, $N_2$ was bubbled for 25 minutes to displace dissolved oxygen. The pH of the solution was adjusted to between 8.8 and 9.2 with NaOH. Then a small quantity of the $H_2S$ gas ($2 \times 10^{-4}$M) was injected into the continuing nitrogen stream at the lowest possible rate while the solution was vigorously stirred with a magnetic stirring bar. Simultaneously, the pH was held close to 8.5 by the dropwise addition of NaOH. The reaction continued for 20 minutes after which the resulting colloid was purged with nitrogen for 20 minutes to remove any residual oxygen or carbon dioxide. The result was an optically clear CdS colloid having an average particle size of around 20 Angstroms and a concentration of $10^{-4}$M.

2. Preparation of 30-50 Angstrom Q-CdS Colloid

The procedure of Example 1 was repeated with the only principle difference being differing concentrations of the starting materials. In this example, $2.5 \times 10^{-3}$M, $Cd^{2+}$, $5 \times 10^{-4}$M PP and 44 ml of $H_2S$ were used. The ratio of Cd to PP was thus increased substantially. The $H_2S$ gas was directly injected into the gas phase above the nitrogen saturated reaction solution was stirred vigorously. The resulting colloid was yellow-greenish indicating a particle size of between 30 and 50 Angstroms. The concentration was $2 \times 10^{-3}$M.

3. Desalting and Concentrating

One liter of fresh Q-CdS colloid prepared as in examples 1 and 2 were concentrated in a rotary evaporator (12 Torr, 28° C.) by a factor 5, thus expelling 80% of the water. The remaining 200 ml colloid suspension (pHF) was placed in a cleaned molecularly porous dialysis tube (regenerated natural cellulose from Spectra/Par with a molecular weight cut-off of 3,500). The colloidal suspension was dialyzed against ultra-pure "Millipore" water for 24 hours. The conductivity of the colloid was monitored periodically. The final conductivity of the purified concentrated colloid did not exceed 30 micro mho. Subsequently, the solution was concentrated by rotary evaporation until the colloidal suspension had a volume of 10 ml.

4. Desalting and Concentrating

As an alternative to the process of Example 3, a 1 liter quantity of fresh dilute Q-CdS colloid, prepared as in Example 1, was concentrated to 200 ml and then introduced into a stirred microfiltration cell. The cell (Micro Filtration Systems) was equipped with a Teflon coated stirring rod, a safety relief valve, and a gas or liquid inlet. The micro filter used was an ultrafiltration membrane, polymer type UH, MWCO=1,000. The concentrated colloidal suspension was washed continuously with ultrapure "Millipore" water under a nitrogen atmosphere ($N_2$ pressure=55 psi). In the first stage of this procedure, the conductivity in the salt solution leaving the stirred cell was measured. When the conductivity approached 20 micro-mho, the procedure was stopped. Then, in a second stage, the cell was connected directly to the nitrogen cylinder and the desalted colloid was concentrated to 10 ml. The resulting optically transparent colloid was stable for days against flocculation and particle growth.

5. Q-CdS Membrane Preparation

Aliquots of 5 ml of the concentrated and purified colloid ($2 \times 10^{-2}$M to $2 \times 10^{-7}$M Q-CdS) were spread over a flat commercial glass plate or plastic Petri dish. The homogeneously covered carriers were kept in a plexiglass box under 60% relative humidity. After two days a supersaturated optically transparent xerogel was obtained. The xerogels recovered were dry gels the stability of which depended on the ratio of $Cd^{2+}$ to PP in the initial solution for high levels of the ratio of $Cd^{2+}$ to PP, the transition from a colloid to a xerogel was irreversible and the xerogel was insoluble and retained its shape in water. For very low rations, the xerogel could be resuspended as a colloid. For intermediate values of the ratio, the xerogel was rigid when dry but became elastic and flexible when in water although it would not resuspend.

To finalize the transformation to membrane form, the humidity of drying was lowered to 20-30% (i.e. ambient room humidity) and continued. In a last drying step, the membrane was dried in a high vacuum ($10^{-5}$ torr) at a slightly elevated temperature (40° C.).

6. Results

The resulting CdS membranes were generally obtained in reasonably crack-free condition. They exhibit strong luminescence at room temperature and vary in color from colorless to yellow-green.

Shown in FIG. 1 is the optical spectrum of a Q-CdS membrane compared to a Q-CdS colloidal suspension. The onset of adsorption is about 460 nm for both samples, indicating a particle size of approximately 30 Angstroms. This is in strong contrast to the absorption onset for CdS macrocrystals at 515 nm thus demonstrating the size quantization effect presumably due to the exciton in the particle box phenomenon described in the literature, Henglein supra.

FIGS. 2 and 3 shows luminescence (excitation at 515 nm) and corrected luminescence - excitation (emission at 505 nm) spectra in a fresh Q-CdS colloid and a Q-CdS membrane respectively. FIG. 3 also illustrates that the increasing particle size in the membrane causes a redshift in the spectral characteristics of the membrane. Unlike the Q-CdS colloids, in the membranes the shape and maximum of the luminescence spectra is independent of the excitation wavelength.

Interestingly, the Q-CdS membranes produced as described here are highly emissive when dry and are non-conductive In the presence of water, the emissivity is quenched and conductivity increases.

We claim:

1. A method of making a cadmium sulfide membrane comprising the steps of
   a) preparing a cadmium sulfide colloid by introducing sulfide ions to an aqueous solution of $2.5 \times 10^{-3}$M cadmium ions and polyphosphate molecules;
   b) concentrating the colloid by removing water from the colloid by concentration until the concentrated colloid has an electrical conductivity which exceeds twenty micro-mhos;
   c) drying the concentrated colloid until a solid membrane is produced.

2. A method as claimed in claim 1 wherein the preparing step (a) further comprises simultaneously adding sufficient base to the aqueous solution to maintain a pH of approximately 8.5.

3. A method as claimed in claim 1 wherein in the preparing step (a) there is between two and five times greater molarity of cadmium ions in the solution as polyphosphate molecules.

4. A method as claimed in claim 1 wherein the sulfide is introduced into the solution by bubbling $H_2S$ gas through the solution.

5. A method as claimed in claim 1, the colloid from step (a) is initially concentrated in a rotary evaporator.

6. A method as claimed in claim 1 wherein the concentrating step (b) takes place by rotary evaporation and further comprises dialyzing the colloid against a membrane having molecularly-sized pores.

7. A method as claimed in claim 1 where step (b) further comprises filtering the colloid through a micro-filter.

8. A method as claimed in claim 1 wherein the concentrating step (b) comprises filtering the colloid through a micro-filter under pressure applied by an inert gas.

9. A method as claimed in claim 1 wherein the drying step (c) comprises first drying the concentrated colloid in a relative humidity in excess of 50% and subsequently further drying the colloid by vacuum drying.

10. The method of claim 1 wherein the level of electrical conductivity in step (b) is twenty to thirty micro-mhos.

* * * * *